(12) United States Patent
Wihinen

(10) Patent No.: US 8,523,285 B2
(45) Date of Patent: Sep. 3, 2013

(54) VEHICLE SEAT

(75) Inventor: Kimmo Wihinen, Laukaa (FI)

(73) Assignee: Valtra Oy Ab, Suolahti (FI)

( * ) Notice: Subject to any disclaimer, the term of this patent is extended or adjusted under 35 U.S.C. 154(b) by 236 days.

(21) Appl. No.: 12/865,900

(22) PCT Filed: Jan. 27, 2009

(86) PCT No.: PCT/IB2009/000134
§ 371 (c)(1),
(2), (4) Date: Oct. 5, 2010

(87) PCT Pub. No.: WO2009/098560
PCT Pub. Date: Aug. 13, 2009

(65) Prior Publication Data
US 2011/0049961 A1 Mar. 3, 2011

(30) Foreign Application Priority Data
Feb. 4, 2008 (GB) .................................. 0801972.1

(51) Int. Cl.
*B60N 2/64* (2006.01)
(52) U.S. Cl.
USPC .................. 297/452.29; 297/452.33; 297/483
(58) Field of Classification Search
USPC ................. 297/452.29, 452.33, 483
See application file for complete search history.

(56) References Cited

U.S. PATENT DOCUMENTS

| | | | |
|---|---|---|---|
| 2,935,120 A | 5/1960 | Naus | |
| 4,607,882 A * | 8/1986 | Opsvik | 297/195.11 |
| 4,832,407 A * | 5/1989 | Serber | 297/423.12 |
| 5,186,519 A * | 2/1993 | Larson | 297/423.12 |
| 5,328,245 A * | 7/1994 | Marks et al. | 297/284.3 |
| 6,027,171 A * | 2/2000 | Partington et al. | 297/452.18 |
| D461,064 S * | 8/2002 | Fogderud | D6/363 |
| 6,550,858 B1 * | 4/2003 | Grohs et al. | 297/216.1 |
| D485,111 S * | 1/2004 | Keilhauer | D6/601 |
| 6,910,736 B2 * | 6/2005 | White | 297/284.3 |
| 6,986,549 B2 * | 1/2006 | Kniese | 297/284.1 |

FOREIGN PATENT DOCUMENTS

| | | |
|---|---|---|
| DE | 298 04 359 | 7/1998 |
| JP | 57 144136 A | 9/1982 |
| JP | 2007 119202 A | 5/2007 |

OTHER PUBLICATIONS

International Search Report for International Applicaiton No. PCT/IB2009/000134 Dated May 27, 2009.

* cited by examiner

*Primary Examiner* — Peter Brown

(57) ABSTRACT

A seat (10) for a utility vehicle comprising a base (12) and a back support (14) is provided. The back support has an asymmetric profile (18) which includes a cut-away portion (20) at a position corresponding to a user's first shoulder, and a mounting point (25) corresponding to a point located above the user's second shoulder for attachment of a three-point harness (22, 24). Provision of the cut-away portion on one upper corner of the seat maintains a portion on the opposite side of the seat for location of the three-point harness thus delivering increased freedom of movement for the operator whilst incorporating safety requirements.

3 Claims, 2 Drawing Sheets

VEHICLE SEAT

The invention relates to a vehicle seat and particularly, but not exclusively, a seat fitted to a utility vehicle such as a tractor.

It is an object of the present invention to provide an improved seat suitable for use in a utility vehicle.

According to the invention there is provided a seat for a utility vehicle comprising a base, a back support having an asymmetric profile which includes a cut-away portion at a position corresponding to a user's first shoulder, and a mounting point corresponding to a point located above the user's second shoulder for attachment of a three-point harness.

The invention involves the recognition of the operator's need to frequently twist their body to one side when looking behind them when operating machinery mounted at the rear of the vehicle for example. This is particularly applicable when the main instrument panel of the utility vehicle is located to that side of the operator. The asymmetric profile having a cut-out portion allows freedom for the operator to twist his shoulder behind the seat thereby providing more comfort during operation of the vehicle.

In recognition of the fact that the operator tends to turn to only one side in normal operation, the invention exploits the opposite side of the seat to provide a point to attach the upper part of a three-point harness. The ergonomic provision of a three-point harness in a utility vehicle has traditionally proved difficult due to the added restriction of movement over the shoulder adjacent the upper part of the harness. The acceptance that an operator need only turn to one side to view behind allows such incorporation.

In a preferred embodiment, the profile includes a further cut-away portion at a position corresponding to the user's second shoulder. Advantageously, this provides a further reduction in the weight of the seat together with more freedom of movement of the operator's shoulders without reducing support for the spine.

According to a further aspect of the invention there is provided a tractor provided with a seat as hereinbefore described.

Further advantages will become apparent from the following description of the invention, by way of example only, with reference to the accompanying drawings in which.

Figure 1:
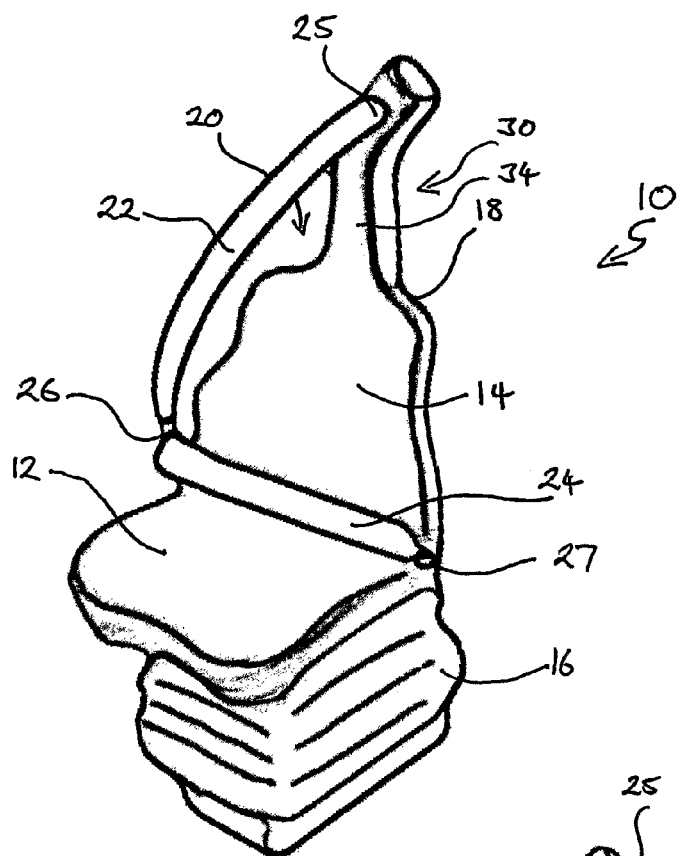
FIG. 1 is a perspective view from the front of a seat in accordance with an embodiment of the invention.

Referring to the drawings, a seat 10 comprises a base 12 and a back support 14. The base 12 is fixed to a seat mount 16 which is mounted to the floor of a tractor cab (not shown). The seat mount 16 comprises adjustable pneumatic suspension means which serves to provide a cushioning function to the operator. Both the base 12 and back support 14 comprise a rigid frame covered by a cushioned fabric.

Figure 2:
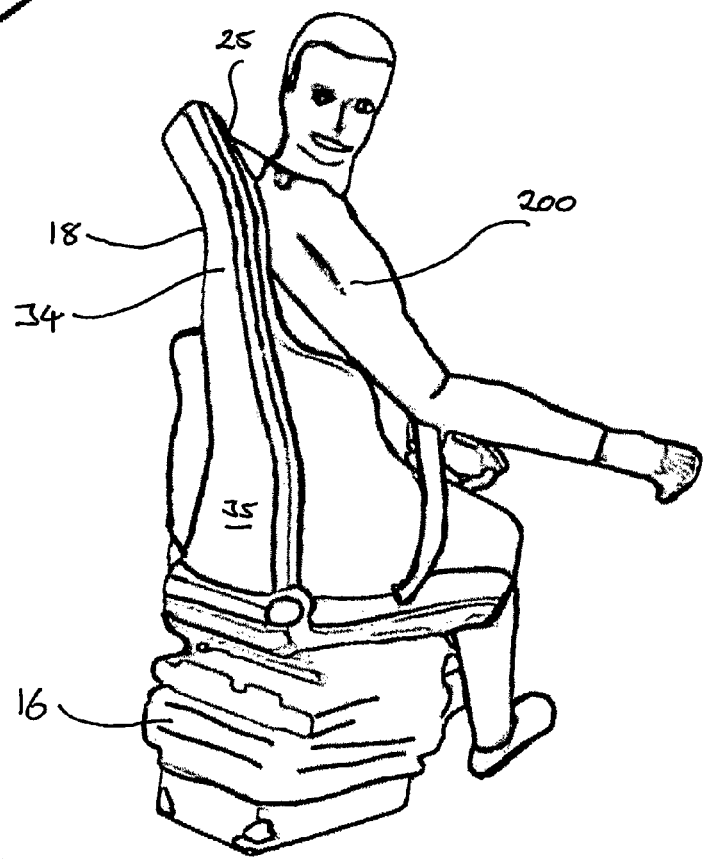
FIG. 2 is a perspective view from the rear of the seat of FIG. 1, and shown with an operator in the seat twisting to one side to view behind.

The back support 14 has an asymmetric profile 18, or outline, defined by its peripheral edge. The profile 18 includes a cut-away portion 20 which corresponds to an operator's first shoulder 200. As can be seen from FIG. 2, the cut-away portion 20 provides the operator with an improved freedom to twist their body to one side, thereby allowing better access to view behind the seat 10 over the first shoulder 200.

The increased freedom for the operator to twist in one direction is particularly advantageous when the seat is implemented in a utility vehicle wherein the main instrument panel (used to operate any attached implements, not shown) is located to that side of the operator. For example, a hedge trimmer attached to the rear of a tractor may be set up to operate to the right-hand side of a tractor. Furthermore, the controls for the hedge trimmer may be located to the right of the operator. The cut-away portion 20, perhaps in combination with a rotating seat, allows comfortable freedom of movement for the operator.

Referring again to the drawings, a three-point harness comprises an upper belt 22 and a lower belt 24. The upper belt 22 is fixably attached at one end to a mounting point 25 corresponding to a point located above the user's second shoulder. The other end of the upper belt is attached to an engagement member 26 which serves to engage with a receiving slot when the harness is in use.

The lower belt 24 is fixably attached at one end to a lower attachment point 27 located on the base 12 at the side remote the cut-away portion 20, the belt 24 extending across the lap of the operator when in use, and being attached at the other end to the engagement member 26.

The profile includes a further cut-away portion 30 at a position corresponding to the operator's second shoulder. This leaves a spine supporting extension 34 which is a continuation of a support member 35 attached to the base 12 and to which the cushioned back support 14 is attached. Above a point corresponding to the top of the operator's spine, the spine supporting member 35 curves to the side above the operator's second shoulder and provides a member for location of the mounting point 25.

The combination of the cut-away portion 20 on one side and the curved portion of the spine supporting extension 34 on the other side provides an asymmetric back support profile around a hypothetical longitudinal vertical plane intersecting the centre of the seat. The inventive profile is both functional and lightweight without any complex manufacturing steps.

Figure 3:
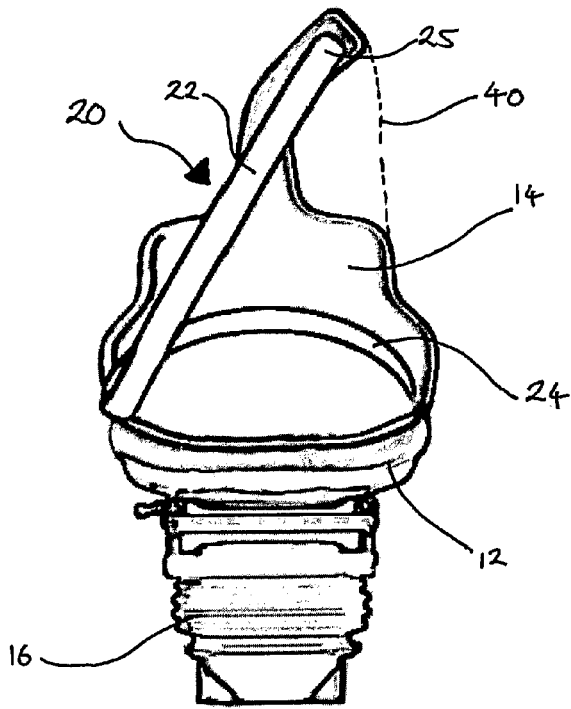
FIG. 3 is a front view of the seat of FIG. 1.
Figure 4:
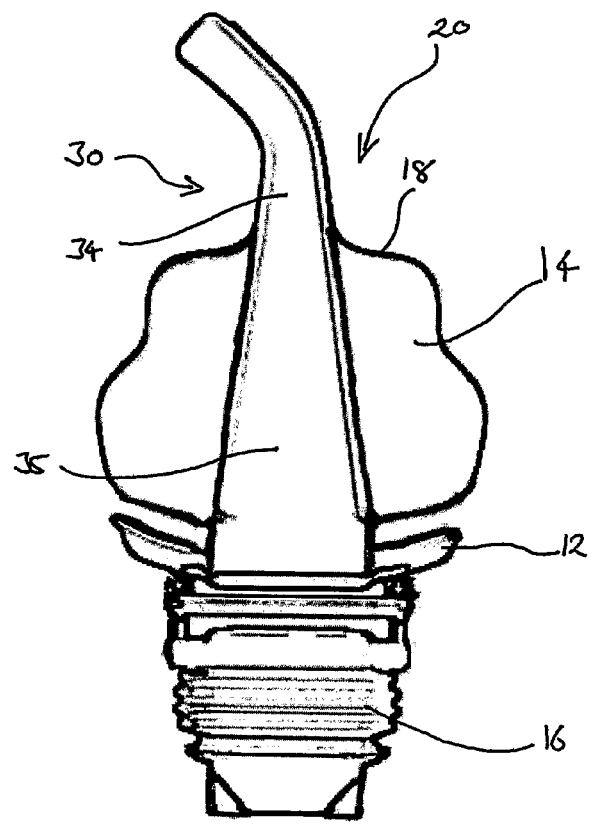
FIG. 4 is a rear view of the seat of FIG. 1.

In an alternative embodiment, the further cut-away portion is omitted leaving a profile designated by the dashed line 40 in FIG. 3.

In summary, there is provided a seat for a utility vehicle comprising a base and a back support. The back support has a profile which includes a cut-away portion at a position corresponding to a user's first shoulder, and a mounting point corresponding to a point located above the user's second shoulder for attachment of a three-point harness. Provision of the cut-away portion on one upper corner of the seat maintains a portion on the opposite side of the seat for location of the three-point harness thus delivering increased freedom of movement for the operator whilst incorporating safety requirements.

The invention claimed is:

1. A seat for a utility vehicle, comprising:
a base,
a back support having:
a lower portion of generally standard width; and
a relatively narrow asymmetric central spine supporting member which curves to one side at the top, that extends upwardly from a central part of an upper edge of the lower portion, and which includes a mounting point disposed on the curved part of the spine supporting member for attachment of a three-point harness, and wherein the lower portion is adapted to support a lower back portion of a user, and the central spine supporting member is adapted to support an upper back portion of a user while allowing rearward or twisting movement of the user's shoulders during operation of the vehicle.

2. A seat according to claim 1, further comprising a three-point harness attached to said mounting point.

3. A tractor, comprising:
a seat mount; and
a seat, wherein said seat comprises:
 a base,
 a back support comprising:
 a lower portion of generally standard width; and
 a relatively narrow asymmetric central spine supporting member which curves to one side at the top, that extends upwardly from a central part of an upper edge of the lower portion, and which includes a mounting point disposed on the curved part of the spine supporting member for attachment of a three-point harness, and wherein the lower portion is adapted to to support a lower back portion of a user, and the central spine supporting member is adapted to support an upper back portion of a user while allowing rearward or twisting movement of the user's shoulders during operation of the vehicle.

\* \* \* \* \*